United States Patent [19]
Dwyer et al.

[11] 3,722,696
[45] Mar. 27, 1973

[54] SPIRAL-WOUND FILTER

[75] Inventors: James L. Dwyer, Concord; Peter A. Reiman, Weston, both of Mass.

[73] Assignee: Millipore Corporation, Bedford, Mass.

[22] Filed: Apr. 22, 1971

[21] Appl. No.: 136,315

[52] U.S. Cl. ................210/435, 210/494, 210/497
[51] Int. Cl. .............................................B01d 27/00
[58] Field of Search..............210/492, 494, 497, 435

[56] References Cited

UNITED STATES PATENTS

| 1,872,430 | 8/1932 | Ericson | 210/494 X |
| 2,883,058 | 4/1959 | Jaume | 210/494 X |
| 3,510,004 | 5/1970 | Hoeltzenbein | 210/494 X |
| 2,322,548 | 6/1943 | Sigmund | 210/494 X |

FOREIGN PATENTS OR APPLICATIONS

| 1,189,159 | 9/1959 | France | 210/494 |

Primary Examiner—Samih N. Zaharna
Assistant Examiner—F. F. Calvetti
Attorney—Clarence S. Lyon

[57] ABSTRACT

A filter unit formed by spirally winding a multi-layer material around a core to form a generally cylindrical construction having two opposing spiral end surfaces. The multilayer material used to make the filter unit has at least one filter layer, at least two generally flat spacer layers formed from a material with a high void volume and at least one fluid-impermeable layer. The layers are adhered along the lengthwise and widthwise edges so that, in use, unfiltered fluid supplied to the unit through one spiral end surface must pass through a filter layer before it passes out of the unit through the opposing spiral end surface.

13 Claims, 5 Drawing Figures

3,722,696

INVENTORS
JAMES L. DWYER
PETER A. REIMAN
BY
Kenway, Jenney & Hildreth
ATTORNEYS

INVENTORS
JAMES L. DWYER
PETER A. REIMAN
BY
*Kenway, Jenney; Hildreth*
ATTORNEYS 3,722,696

SPIRAL-WOUND FILTER

This invention relates to a spiral-wound filter construction.

BACKGROUND OF THE INVENTION

In filtration, it is desirable to maximize filter area while minimizing the volume of the filter construction employed. One common means for attaining this result is to provide a construction formed by spirally winding a multi-layer material having a filter layer form a tightly wound cylinder into which liquid is introduced at one spiral end and removed from the opposite spiral end. Means must be provided in the filter construction for assuring that all entering liquid passes through the filter medium prior to being removed; that is, the entering liquid must be prevented from simply passing through the spaces between the wound filter material without passing through the filter medium. It has been proposed to employ corrugated filter media in spiral wound filter constructions to maximize filter surface area for a given filter construction volume. Such constructions are shown for example in U.S. Pat. Nos. 2,599,604 to Bauer et al. and 3,025,963 to Bauer. In these constructions, sealing arrangements are provided at each spiral surface of the wound filter to assure that incoming fluid passes through a filter surface before leaving the unit. However, a spiral-wound filter construction using a corrugated filter material has undesirable strength characteristics which has limited the use of this construction. When fluid is introduced into the corrugations, even under moderate pressure or when filter loading is increased due to particle accumulation, the flutes become compressed along their entire length resulting in severe stress being placed upon the filter material. Under these compression forces, the chances of rupturing the filter material and rendering the construction useless are greatly increased. Due to these undesirable strength characteristics, practical utilization of these filters is greatly limited. It would be highly desirable to provide a filter construction having a large filter area per unit volume which permits the use of relatively high differential pressures without the attendant high risk of rupturing the filter medium.

SUMMARY OF THE INVENTION

The present invention provides a spiral-wound filter construction formed by winding a flat multi-layer web. The layers forming the web are sealed in a configuration assuring that fluid entering the construction through one spiral end surface passes through at least one filter surface prior to exit from the construction. The multi-layer web includes at least one filter layer and may include several filter layers. Each filter layer is placed between two flat spacer layers having high void volume. At least one fluid-impermeable layer is placed against the surface of one of the spacer layers. By forming the multi-layer web to be wound with a generally-flat spacer layer, a compact filter construction can be formed which has a higher filter surface area per unit volume than was attainable when employing a corrugated layer. Furthermore, since both the filter layer and spacer layers are flat, greatly improved support for the filter layer is attained because of the greater filter surface area contacting the spacer layer. Also, because the filter layer is flat and not corrugated, the danger of rupturing the filter along the flutes, which is an important consideration in the prior art constructions, is eliminated. The spirally-wound construction of this invention is selectively sealed at each spiral end surface and along the end widths to assure that fluid entering the construction through one spiral end surface must pass through a filter layer prior to being removed from the construction through the opposing spiral end surface. One set of spacer layers adjacent to or contacting a first surface of each filter layer is open to the atmosphere on a first spiral end surface and closed to the atmosphere on the second spiral end surface. A second set of spacer layers contacting the second surface opposing the first surface of each filter layer is open to the atmosphere on the second spiral end surface and closed to the atmosphere on the first spiral end surface. The position of the fluid-impermeable layer or layers is such as to prevent contact of spacer layers open on opposing spiral end surfaces. It is preferred that fluid-impermeable layers do not contact but if they do they should be sealed to each other on at least one end to prevent unfiltered fluid from passing through the space between these layers. To prevent incoming fluid from entering the widthwise edges of the multi-layer construction and intermixing with filtered fluid prior to passing through a filter surface, one of the sets of spacer layers is sealed from the atmosphere along the widthwise edges adjacent the center of the spiral and remote from the center of the spiral. To prevent unfiltered fluid from passing through the center of the spiral, the center of the spiral is sealed adjacent at least one spiral end surface.

BRIEF DESCRIPTION OF THE DRAWINGS

The invention will be more fully described with reference to the accompanying drawings.

DESCRIPTION OF SPECIFIC EMBODIMENTS

Figure 1:
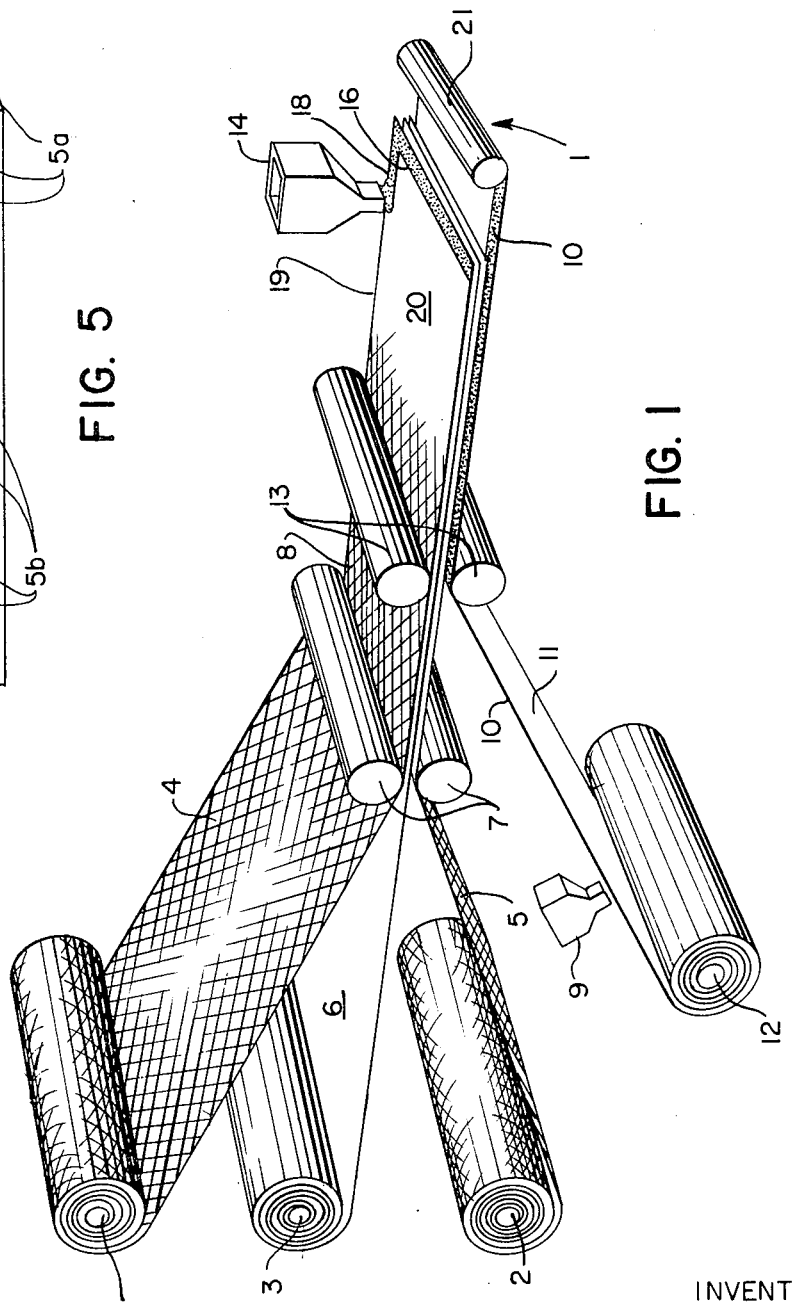
FIG. 1 is a schematic diagram of one method of forming the spiral filter.

Referring to FIG. 1, generally flat spacer layers 4 and 5 having a high percentage of void volume are stored respectively on storage rolls 2 and 1 and a flexible filter layer 6 is stored on storage roll 3. The spacer layers 4 and 5 and the filter layer 6 are passed through a set of rollers 7 so that they are held in close relationship across their width to form a multi-layer web 8. An adhesive strip 10, is dispensed from dispenser 9 and placed upon the moving liquid-impermeable layer 11 as it is unrolled from storage roller 12. The liquid-impermeable sheet 11 and adhesive 10 then are contacted to the spacer layer 5 of the multi-layer web 8 and passed through a set of rollers 13 to adhere the spacer 5 to the sheet 11 and one surface of the filter material 6. Adhesive material also is dispensed from dispenser 14 to form a widthwise strip 16 at or near the leading edge 17 of the spacer layer 4 and a lengthwise strip 18 at or near the lengthwise edge 19 of the multi-layer web 20.

The adhesive employed does not effect immediate permanent adhesion of the layers when passing through the rollers 13. The adhesive is chosen so that the multi-layer web can be rolled on core 21 prior to curing the adhesive and the adhesive is cured after the spiral filter construction is formed. Sufficient adhesive is employed to provide the desired seal between adjacent layers of the web but in amounts less than will migrate through the filter layer and cause undesirable sealing of the opposing filter surface on the same spiral end. When the multi-layer web 20 is rolled on filter core 21, the adhesive strip 18 will contact and adhere to the liquid-impermeable sheet 11 on the surface and lengthwise edge opposite the surface and lengthwise edge upon which adhesive strip 10 is placed. The desired filter length is attained by cutting the layers 4, 5 and 6 widthwise while permitting layer 11 to be unrolled a sufficient length so that it can enclose the resultant construction. An adhesive strip is applied to the following widthwise edge of the spacer layer 4. In addition, the adhesive strip 10 is continued to the following edge of the sheet 11.

Figure 2:
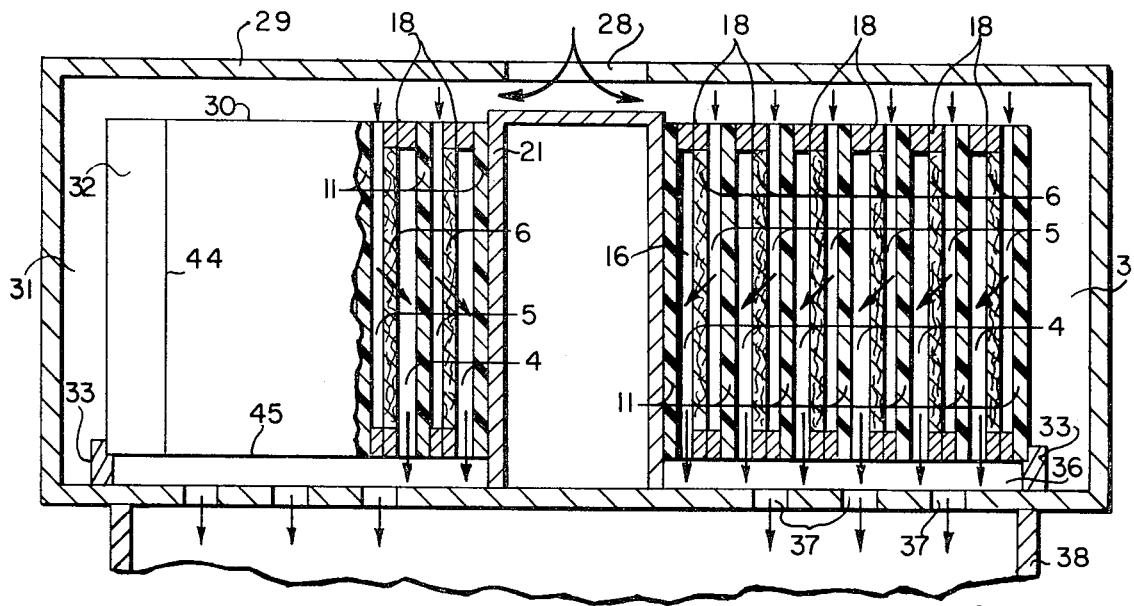
FIG. 2 is a partial vertical cross-sectional view of the spiral filter construction.

The path of fluid flow through the spiral filter formed as shown in FIG. 1 will be described with reference to FIGS. 2 and 3. Incoming fluid enters opening 28 of housing 29 and is directed to the top surface 30 of filter cartridge 32 and into the spacer 31 between the housing 29 and the filter cartridge 32. Fluid is prevented from by-passing the filter cartridge 32 by means of sealing wall 33. Incoming fluid fills the space 31 and then is free to pass downwardly through the filter 32 by entering the void volume in spacer layer 5 and passing downwardly therein and through the filter layer 6 into spacer layer 4 in contact with the opposing surface of filter layer 6. Since the spacer layer 4 is unsealed on the bottom spiral surface 45, the fluid is free to pass downwardly therethrough and out of the filter 32 into space 36 formed by the sealing wall 33, the bottom spiral surface 45 and the housing 29. The filtrate passes out of the space 36 through holes 37 in the bottom of the housing 29 into a fluid collector 38. Unfiltered fluid is prevented from passing between the outside surface of core 21 and the adjacent impermeable layer 11 by means of adhesive strip 10 adhering the core 21 and strip 11. Unfiltered fluid is prevented from entering through the edge 39 of the spacer layer 4 by means of adhesive strip 16 which fills the void volume in the spacer layer 4 and adheres spacer layer 4 to the adjacent layers 11 and 6.

Figure 3:
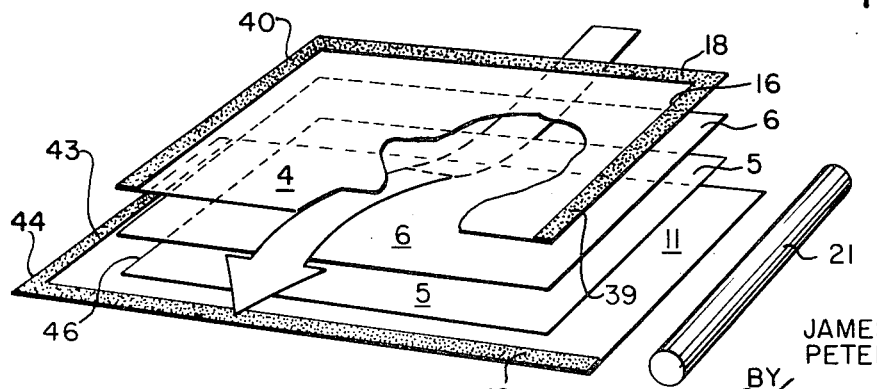
FIG. 3 is an isometric view of the filter of FIG. 2 when unwound.

As shown in FIG. 3, the liquid-impermeable surface 11 comprises the bottom surface of the multi-layer web with the upper layers comprising respectively a spacer layer 5, a filter layer 6, and another spacer layer 4. These layer are adhered in the manner described above and have adhesive strip 40 on the trailing edge of spacer layer 4 that fills the voids in spacer layer 4 and adheres spacer layer 4 to the adjacent portions of filter layer 6 and liquid-impermeable layer 11 thereby preventing incoming fluid from entering the cartridge 32 into the spacer layer 4 on the downstream side of the filter layer 6. The adhesive strips 16 and 40 are applied at the desired locations, depending upon the size of the filter desired, by halting the moving layer and applying the adhesive across the width of spacer layer 4. An adhesive strip 43 provides a means for adhering the trailing edge 44 of the liquid-impermeable layer 11. In this embodiment, layer 11 is sufficiently longer than the remaining layers so that it circumscribes the entire filter cartridge to form the outside surface of the cartridge. Alternatively, the edge 44 can be heat sealed to the adjacent sheet. It is not necessary to cut layer 11 longer than the remaining layer as to employ adhesive strip 43. In fact when the adhesive strip 43 is not applied, fluid is free to enter the edge 46 into the spacer layer 5 upstream of the filter layer 6. A filter cartridge may be eliminating adhesive strip 43 provides a convenient means for emptying space 31 of fluid to be filtered. In this manner, substantially all of the fluid can be processed through the filter. When adhesive strip 43 is employed, fluid in space 31 cannot enter the filter cartridge and is lost. Alternatively, strip 43 can be perforated and space 31 on the outside layer 11, only in that portion thereof which forms the outside surface of the filter, can be perforated to permit filtering liquid in space 31.

Figure 4:
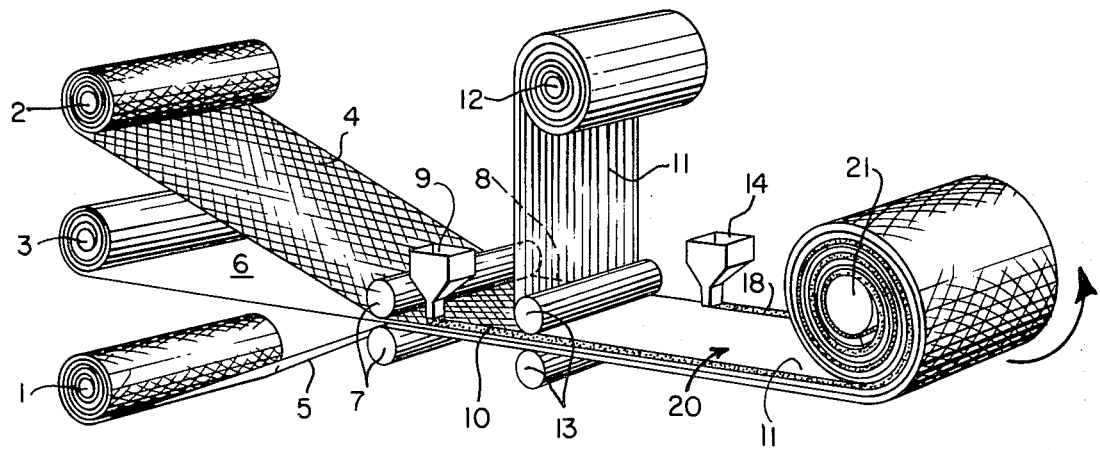
FIG. 4 shows an alternative method for making a filter of this invention.

For convenience, the elements shown in FIG. 4 are numbered the same as the corresponding elements shown in FIG. 1 As shown in FIG. 4, spacer layers 4 and 5 are stored respectively on storage rolls 1 and 2 and a filter layer 6 is stored on storage roll 3. The spacer layers 4 and 5 and the filer layer 6 are passed through a set of rollers 7 so that they are held in close relationship across their width. After passing through rollers 7, an adhesive strip 10 is placed upon the moving multi-layer web 8 by means of dispenser 9 at or close to the edge of the web 8. After the adhesive 10 has been applied, it is contacted with a liquid-impermeable layer 11 that is unrolled from storage roller 12. The resulting multi-layer web 20 passes between a set of rollers 13 in contact with the adhesive 10 to adhere the spacer layer 4, the liquid-impermeable layer 11 and one surface of the filter layer 6. After the liquid-impermeable layer 11 has been applied to the multi-layer web 8, adhesive strip 18 is dispensed by means of dispenser 14. The resulting multi-layer web 20 is rolled on filter core 21 so that adhesive 18 will contact and adhere to the spacer layer 5 and the filter layer 6 on its lengthwise edge and surface opposite its surface and lengthwise edge contacted with adhesive 10. Prior to applying the adhesive strip 18, the liquid-impermeable layer 11 is adhered to the filter core 21 with adhesive which extends around the circumference of core 21. Widthwise adhesive strips are applied either by means of dispenser 9 or dispenser 14, in the manner described above for FIG. 1.

The fluid-impermeable layer can comprise any flexible material sufficiently strong to prevent fluid passage, even at high pressures. It is desirable that this layer, as well as the filter layer, be relatively thin to maximize filter surface area for a given filter volume. Particularly suitable liquid-impermeable materials include polyvinyls such as polyvinyl chloride, polyvinyl acetate, polyolefins such as polyethylene and polypropylene and polyesters.

Figure 5:
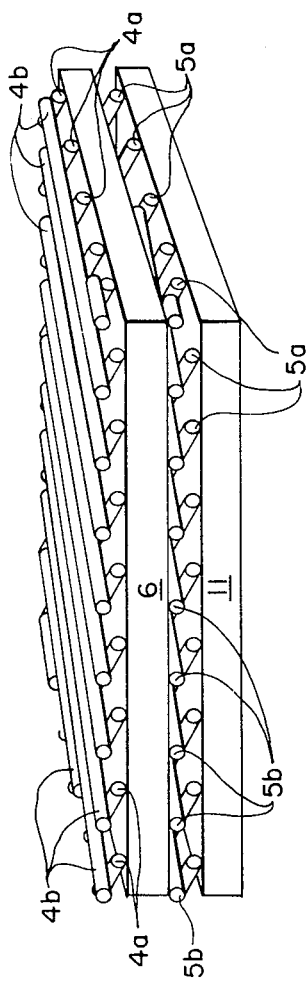
FIG. 5 is a vertical cross-sectional view of a multi-layer web that can be wound to form the spiral filter of this invention.

The spacer layers can comprise either a woven or nonwoven material having a high void volume, which permits fluid transfer across or through the material at reasonably high rates without the need for high inlet pressures. In addition, the spacer layer should have a thickness sufficiently great to permit substantial fluid flow rates but not so thick as to reduce filter surface area and filter capacity substantially for a given filter volume. It is preferred that the spacer layer be between about 0.020 and 0.030 inch thick. Suitable spacer layers include netting formed from plastic materials, cloth, paper or the like. A particularly suitable spacer layer is shown in FIG. 5 and comprises a netting formed by two sets of parallel plastic strands wherein one set is laid on and adhered to one surface of the other set in an arrangement whereby the sets intersect at an angle. This structure when placed adjacent two flat filter layers or one flat filter layer and a flat impermeable layer has each set of strands in contact with only one adjacent flat layer so that fluid can pass easily into the spacer layer and between the two flat layers. As shown in FIG. 5, the multi-layer web comprises the liquid-impermeable layer 11, the filter layer 6 and the spacer layers 4 and 5. The spacer layer 4 is formed by adhering one set of plastic strands 4a to the surface of a second set of strands 4b thereby forming a layer having substantial void volume and which permits fluid within the spacer layer 4 to contact the adjacent layers 11 and 6. Spacer layer 5 has the same configuration as spacer layer 4 and is formed with two sets of strands 5a and 5b. Thus, the surfaces of the spacer layers are generally flat, i.e. the surfaces of each set of strands lie generally in the same plane.

The filter layer must be sufficiently pliable to permit winding it around the core without fracturing the filter. While many filter materials are sufficiently pliable for this purpose, some filter materials are too brittle to afford their use and must be modified prior to being incorporated in the multi-layer web. Such filter materials include microporous materials formed from cellulose esters such as cellulose acetate and cellulose nitrate and having an average pore size extending into the submicrometer range as small as about 0.025 micrometer, marketed by Millipore Corp. and identified as MF — Millipore(R) filters, Celotate(R) filters, Duralon(R) filters, Mitex(R) filters, Polyvic(R) filters, Solvinert(R) filters and Microweb(R) filters. To render these filters sufficiently pliable, they are laminated between two pliable porous materials, such as woven cloth formed with polyester fiber, with a net adhesive formed with heat-sealable resin fiber such as polyester and polyethylene fibers. Particularly suitable laminates and their methods of preparation are disclosed in a patent application of Robert V. Tanova and Peter A. Reiman entitled "Filter Laminate Construction" filed Apr. 22, 1971, Ser. no. 136,309. However, it is to be understood that the present invention is not limited to the use of microporous filter layers but includes the use of any flat filter medium that can be wound in the desired configuration shown.

The type and amount of adhesive employed is such that adhesive will penetrate into the filter layer but not through the filter layer when applied so that sealing on one surface of the filter layer does not result in sealing on the opposite surface. Epoxy or polyurethane-based adhesives are particularly useful for providing the desired sealing.

It is to be understood that the present invention is not limited to the structures specifically described but includes obvious modifications thereof. Thus, a filter construction can be prepared by spirally winding a multi-layer web having more than one fluid-impermeable layer more than one filter layer and more than two spacer layers so long as they arrange so that spacer layers sealed on opposing surfaces do not contact. For example, a multi-layer web to be wound can comprise a fluid-impermeable layer two filter layers, and three spacer layers wherein the spacer and filter layers are alternated through the web thickness. Alternatively, a multi-layer web can be formed by joining two of the multi-layer webs shown in FIG. 1 so long as the spacer layer 4 of one multi-layer web is positioned next to the layer 11 of the other multi-layer web. However, these structures may increase production problems due to the added webs being unrolled and adhesive strips applied. Therefore, it is preferred to form the filter by winding a four layer web as specifically described above. Furthermore, it is to be understood that the spacer layers need not be as wide as the filter layers and the fluid-impermeable layers. Filter layers or a filter layer and fluid-impermeable layer contact opposing surfaces of a spacer layer can be sealed at the spiral end surfaces without adhering the spacer layer. All that is necessary is that the seal prevent the entrance or exit of fluid where desired. However, since the spacer layer provides essential support to the adjacent filter it must contact at least a relatively large portion of the filter surface area so that the risk of rupturing the filter layer is not increased substantially. Furthermore, any means for forming a seal can be employed such as heat sealing providing that the seal will permit the slip between layers which occurs upon winding the web on the core.

While the present invention provides a filter having improved strength characteristics primarily because the filter layer is flat and is supported, the spacer layers need not be of uniform thickness. This invention contemplates the use of spacer layers tapered along their width so that the spiral end surface facing incoming unfiltered fluid will have open relatively wide spacer layers having a gradually decreasing width along the axial length of the wound filter. The adjacent spacer layer sealed on the spiral end surface facing incoming unfiltered fluid will be tapered in the opposite direction along the axial length of the wound filter. By employing the tapered spacer layers, fluid can more easily enter and exit the wound filter without greatly increasing its volume.

Furthermore, a solid core, although preferred, is not required in forming the spiral filter construction. If desired, the multi-layer web can be wound around a mandrel that is subsequently removed and the resultant central space is sealed so that unfiltered fluid cannot by-pass a filter layer.

From the above, it is apparent that we have provided a filter construction formed from a multi-layer web that permits use at substantial pressure without a high risk of rupturing the filter layer. Furthermore, the filter construction provides a large filter surface area per unit volume and does not require high filtration pressures to attain desirable rates of fluid flow therethrough.

We claim:

1. A filter unit construction formed from a spirally-wound multi-layer web having two opposed spiral end surfaces, said multi-layer web comprising at least one fluid-impermeable layer, at least one flat filter layer and a plurality of generally-flat spacer layers, said spacer layers being permeable to edgewise fluid flow; each surface of each filter layer contacting a spacer layer, said spacer layers being sealed so that a first set of spacer layers contacting each filter layer on a first surface is open to the atmosphere on a first spiral end surface and closed to the atmosphere on the second spiral end surface and a second set of spacer layers contacting a second surface of each filter layer is open to the atmosphere on the second spiral end surface and closed to the atmosphere on the first spiral end surface, said spacer layers and each fluid impermeable layer being arranged so that spacer layers open on opposing spiral end surfaces are not in contact, the first set of spacer layers being sealed from the atmosphere along the widthwise edge adjacent the center of the spirally-wound unit and along the widthwise edge remote from the center of the spirally-wound unit and the center of said spirally-wound unit being sealed from the atmosphere adjacent at least one spiral end spirally-wound unit surface.

2. The construction of claim 1 wherein the multilayer web is wound around a core extending across the width of the web, said core being sealed from the atmosphere adjacent at least one spiral end surface.

3. The construction of claim 1 wherein the multilayer web comprises a filter layer, two spacer layers and a fluid-impermeable layer, said spacer layers being contiguous each to one surface of the filter layer and said fluid-impermeable layer being contiguous to one spacer layer.

4. The construction of claim 3 wherein the fluid-impermeable layer is sufficiently longer than the remaining layer so that it circumscribes the outer area surface of the construction.

5. The construction of claim 3 wherein the multilayer web is wound around a solid core extending the width of the web, said core being sealed from the atmosphere adjacent at least one spiral end surface.

6. The filter construction of claim 1 wherein the filter layer is a laminate comprising a microporous filter material at least one surface of which is adhered to a macroporous flexible layer with a fibrous adhesive.

7. The filter construction of claim 3 wherein the filter layer is a laminate comprising a microporous filter material at least one surface of which is adhered to a macroporous flexible layer with a fibrous adhesive.

8. A filter construction comprising the spiral filter construction of claim 1 and a housing to enclose said filter, said housing having an inlet and an outlet and means for sealing the outside cylindrical surface of said filter from said outlet.

9. A filter construction comprising the spiral filter construction of claim 3 and a housing to enclose said filter, said housing having an inlet and an outlet and means for sealing the outside cylindrical surface of said filter from said outlet.

10. A filter construction comprising the spiral filter construction of claim 6 and a housing to enclose said filter, said housing having an inlet and an outlet and means for sealing the outside cylindrical surface of said filter from said outlet.

11. The construction of claim 1 wherein the spacer layers comprise two sets of parallel strands, one set of strands being laid on the other set of strands, adhered thereto and arranged to intersect at an angle.

12. The construction of claim 2 wherein the spacer layers comprise two sets of parallel strands, one set of strands being laid on the other set of strands, adhered thereto and arranged to intersect at an angle.

13. The construction of claim 6 wherein the spacer layers comprise two sets of parallel strands, one set of strands being laid on the other set of strands, adhered thereto and arranged to intersect at an angle.

* * * * *